(12) United States Patent
Moman et al.

(10) Patent No.: US 10,730,965 B2
(45) Date of Patent: Aug. 4, 2020

(54) PROCESS FOR MAKING A SOLID CATALYST COMPONENT FOR ETHYLENE POLYMERIZATION AND CO-POLYMERIZATION

(71) Applicant: SABIC GLOBAL TECHNOLOGIES B.V., Bergen Op Zoom (NL)

(72) Inventors: Akhlaq Moman, Riyadh (SA); Ian Blackmore, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 143 days.

(21) Appl. No.: 16/066,442

(22) PCT Filed: Dec. 23, 2016

(86) PCT No.: PCT/EP2016/082548
§ 371 (c)(1),
(2) Date: Jun. 27, 2018

(87) PCT Pub. No.: WO2017/114784
PCT Pub. Date: Jul. 6, 2017

(65) Prior Publication Data
US 2019/0153126 A1 May 23, 2019

(30) Foreign Application Priority Data
Dec. 30, 2015 (EP) .................... 15203218

(51) Int. Cl.
| | | |
|---|---|---|
| C08F 4/649 | (2006.01) |
| C08F 4/654 | (2006.01) |
| C08F 4/655 | (2006.01) |
| C08F 4/656 | (2006.01) |
| C08F 10/02 | (2006.01) |
| C08F 2/34 | (2006.01) |
| C08F 4/651 | (2006.01) |
| C08F 4/659 | (2006.01) |
| C08F 110/02 | (2006.01) |
| C08F 210/02 | (2006.01) |

(52) U.S. Cl.
CPC .............. *C08F 4/6565* (2013.01); *C08F 2/34* (2013.01); *C08F 4/6494* (2013.01); *C08F 4/651* (2013.01); *C08F 4/65916* (2013.01); *C08F 110/02* (2013.01); *C08F 4/6546* (2013.01); *C08F 210/02* (2013.01); *Y02P 20/52* (2015.11)

(58) Field of Classification Search
CPC .... C08F 4/6421; C08F 4/6567; C08F 4/6562; C08F 4/6565; C08F 110/02; C08F 210/02; C08F 4/6494
See application file for complete search history.

(56) References Cited

U.S. PATENT DOCUMENTS

| | | | |
|---|---|---|---|
| 4,302,565 A | 11/1981 | Goeke et al. |
| 4,302,566 A | 11/1981 | Karol et al. |
| 5,258,345 A | 11/1993 | Kissin et al. |
| 5,550,094 A | 8/1996 | Ali et al. |
| 5,561,091 A | 10/1996 | Mink et al. |
| 6,184,169 B1 | 2/2001 | Sartain |
| 7,442,750 B2 | 10/2008 | Jacobsen et al. |
| 2004/0198588 A1 | 10/2004 | Mink et al. |
| 2013/0245218 A1 | 9/2013 | Moman et al. |

FOREIGN PATENT DOCUMENTS

| | | |
|---|---|---|
| EP | 0032309 A2 | 7/1981 |
| EP | 0173470 A2 | 3/1986 |
| EP | 0244678 A1 | 11/1987 |
| EP | 0324588 A2 | 7/1989 |
| EP | 0474249 A1 | 3/1992 |
| EP | 1052266 A1 | 11/2000 |
| EP | 1652863 A1 | 5/2006 |

OTHER PUBLICATIONS

Fripiat et al., "Hydroxyl Content in Silica Gel 'Aerosil'," Journal of Physical Chemistry, vol. 66, Issue 5, 1962, pp. 800-805.
International Search Report for International Application No. PCT/EP2016/082548, International Filing Date Dec. 23, 2016, dated Apr. 13, 2017, 7 pages.
Pullukat, Thomas J. and Hoff, Raymond E., "Silica-Bases Ziegler-Natta Catalysts: A Patent Review", Catal. Rev.-Sci. Eng. 41(3&4), 1999, pp. 389-438.
Written Opinion for International Application No. PCT/EP2016/082548, International Filing Date Dec. 23, 2016, dated Apr. 13, 2017, 8 pages.

*Primary Examiner* — Caixia Lu
(74) *Attorney, Agent, or Firm* — Cantor Colburn LLP

(57) ABSTRACT

The present invention relates to a process for preparing a solid catalyst component suitable for producing polyethylene and its copolymers, said process comprising the steps of: (a) contacting a dehydrated support having hydroxyl groups with a magnesium compound having the general formula $MgR^1R^2$; (b) contacting the product obtained in step (a) with modifying compounds (A) and/or (B) and/or (C), wherein: (A) is at least one oxygen and/or nitrogen comprising organic compound; (B) is a compound having the general formula $R^{11}{}_f(R^{12}O)_g SiX_h$, (C) is a compound having the general formula $(R^{13}O)_4M$, and (c) contacting the product obtained in step (b) with a titanium halide compound having the general formula $TiX_4$, wherein Ti is a titanium atom and X is a halide atom, wherein an organometallic compound is added either before step (a) and/or after step (c). The invention also relates to a solid catalyst component obtainable by said process. The invention further relates to a process for producing polyethylene and its copolymers in the presence of the solid catalyst component and a co-catalyst.

22 Claims, No Drawings

PROCESS FOR MAKING A SOLID CATALYST COMPONENT FOR ETHYLENE POLYMERIZATION AND CO-POLYMERIZATION

CROSS REFERENCE TO RELATED APPLICATIONS

This application is a National Stage application of PCT/EP2016/082548, filed Dec. 23, 2016, which claims the benefit of European Application No. 15203218.1, filed Dec. 30, 2015, both of which are incorporated by reference in their entirety herein.

The present invention relates to a process for making a solid catalyst component suitable for polymerization and copolymerization of ethylene. The invention also relates to a solid catalyst component obtainable by said process. Furthermore, the invention relates to a process of polymerization and copolymerization of ethylene using said catalyst component.

Such process is known from document EP 0173470 A2. This document discloses a process for making a solid catalyst component for a supported Ziegler-Natta catalyst system suitable for ethylene and propylene (co-) polymerisation. Said process comprises the steps of contacting a dehydrated support metal oxide of Group II, III or IV of the Periodic Table, e.g. silica; with an organomagnesium compound, e.g. dialkyl magnesium; and an alkoxy group-containing compound, e.g. an ortho-ester, represented by the formula $X_mC(OR)_{4-m}$, wherein X represents a hydrogen atom, a halogen atom or an alkyl group, R represents a hydrocarbyl group and m is 0, 1 or 2 to give a reaction product, which is then optionally contacted with a halogen-containing compound, e.g. $SiCl_4$; an electron-donating compound, e.g. carboxylic esters, carboxylic acids, carboxylic anhydrides, alcohols, ethers, ketones; and an organic aluminium compound or mixtures thereof prior to or subsequently to the contact of the reaction product with a titanium compound, e.g. $TiCl_4$ or tetrabutoxy titanium. The process for making the catalyst employed in EP 0173470 A2 requires use of excess catalyst components during catalyst preparation, solvent decanting and multiple solvent washings in each step of catalyst preparation. High levels of different solvents are used for each solvent washing, thus generating high levels of hazardous solvent waste material. The ethylene (co-)polymers obtained by employing the process disclosed in EP 0173470 A2 exhibited, for instance, a bulk density of 0.390 g/cm$^3$ and productivity of 321 g polymer/g·cat·hr·atm when $SiCl_4$ was additionally applied in the process.

Processes to prepare catalyst systems to be applied for producing polyethylene and its copolymers are generally known in the art. The essential components used in the preparation of such catalysts typically include a supported magnesium compound, a titanium compound supported thereon and an organoaluminium compound. Such catalysts are generally referred to in the art as supported Ziegler-Natta catalysts and an overview of such catalyst types is for example given by T. Pullukat and R. Hoff in Catal. Rev.— Sci. Eng. 41, vol. 3 and 4, 389-438, 1999.

U.S. Pat. No. 5,561,091 discloses a process for obtaining polyethylenes with narrow molecular weight distribution by employing the steps of (i) contacting a solid, porous carrier having reactive hydroxyl (OH) groups in a non-polar liquid with dialkylmagnesium, with the molar ratio of dialkylmagnesium to the OH groups of from 1.1 to 2.5 to form a product; (ii) introducing into the liquid containing said product of step (i) a mixture of $SiCl_4$ and an alcohol to form a slurry, with the molar ratio of $SiCl_4$ to Mg of 0.40 to 1.40, the molar ratio of the alcohol to magnesium of at least 1.32 and with a molar ratio between the alcohol and $SiCl_4$ of 2.00 to 6.00; and (iii) contacting the slurry of step (ii) with a transition metal compound selected from the group of titanium tetrachloride, titanium alkoxides, vanadium halides and vanadium alkoxides in a non-polar liquid medium to form a catalyst precursor, the transition metal compound being used in excess of the number of moles of hydroxyl groups on said carrier prior to reaction with dialkylmagnesium. The catalyst preparation disclosed in U.S. Pat. No. 5,561,091 is a complex process as it requires two separate vessels.

A drawback of the process and the catalyst composition disclosed in EP 0173470 A2 is relatively low productivity of the catalyst and low bulk density of the polymer obtained in the polymerisation process.

It is the object of the present invention to provide a process for preparing a solid polymerization catalyst component that shows a combination of higher productivity in ethylene polymerization and copolymerization process, higher bulk density and to allow control of the molecular weight distribution of the ethylene polymers and copolymers obtained by employing said process.

This object is achieved by the process for preparing a solid catalyst component suitable for producing polyethylene and its copolymers, said process comprising the steps of and/or consisting of the steps of:

(a) contacting a dehydrated support having hydroxyl groups with a magnesium compound having the general formula $MgR^1R^2$, wherein $R^1$ and $R^2$ are the same or different and are independently selected from the group comprising an alkyl group, alkenyl group, alkadienyl group, aryl group, alkaryl group, alkenylaryl group and alkadienylaryl group;

(b) contacting the product obtained in step (a) with modifying compounds (A) and/or (B) and/or (C), wherein (A) is an oxygen and/or nitrogen comprising organic compound (B) is a compound having the general formula $R^{11}{}_f(R^{12}O)_g SiX_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and $R^{11}$ and $R^{12}$ are the same or different and are independently selected from the group comprising an alkyl group, alkenyl group, alkadienyl group, aryl group, alkaryl group, alkenylaryl group and alkadienylaryl group;

(C) is a compound having the general formula $(R^{13}O)_4M$, wherein M is a titanium atom, a zirconium atom or a vanadium atom, O is an oxygen atom and $R^{13}$ is selected from the group comprising an alkyl group, alkenyl group, alkadienyl group, aryl group, alkaryl group, alkenylaryl group and alkadienylaryl group; and (c) contacting the product obtained in step (b) with a titanium halide compound having the general formula $TiX_4$, wherein Ti is a titanium atom and X is a halide atom, wherein an organometallic compound may be added either before step (a) and/or after step (c).

The process according to the invention may for example consist of the steps listed above. This may preferably mean without any additional and/or intermediate steps.

That an organometallic compound may be added either before step (a) may thereby mean that it may be added before the addition of the magnesium compound on a dehydrated support having hydroxyl groups carried out in step (a).

This may lead to a narrower the molecular weight distribution (MWD), defined as a ratio of the weight average molecular weight (Mw) and the number average molecular weight (Mn), i.e. Mw/Mn determined by Gel Permeation Chromatography (GPC) of the product and/or a higher MFI and/or an increased hydrogen response. This may also lead to a higher catalyst productivity.

Another advantage of the process according to the invention is that the molecular weight distribution, defined as a ratio of the weight average molecular weight (Mw) and the number average molecular weight (Mn), i.e. Mw/Mn determined by Gel Permeation Chromatography (GPC) of the product obtained is found to be readily varied, for example in the range of about 3 to about 5, preferably in the range of between 3 to 4, especially preferred between >3.2 to 4, further preferred between >3.3 to <3.8 or between >3.3 to <3.6.

Additional advantages of the process according to the present invention include improved mechanical properties of the obtained ethylene polymers and copolymers, particularly increased stiffness, resulting in improved conversion behaviour and efficiency; and increased impact resistance, tensile strength and tensile elongation. Moreover, an improvement of such properties allows for example down-gauging of the product and thus reduced material costs.

Also, lower level of small polymer particles ("fines") may be obtained by applying the process of the present invention, which has the advantage of maintaining continuity of the polymerization process by preventing static formation, sheeting or fouling in the polymerization reactor.

Further advantages of the present invention is that the entire catalyst preparation process can be conducted in one vessel and that the solvent decanting, the solvent filtering and the solvent washing steps used in the prior art can be eliminated.

The process of the present invention for making the solid catalyst component for a supported Ziegler-Natta catalyst system suitable for producing ethylene polymers and copolymers comprises a first step (a) of contacting a dehydrated solid support having hydroxyl (OH) groups with a magnesium compound to form a solid magnesium containing support material.

The solid support according to the present invention is any material containing hydroxyl groups. Suitable examples of such materials include inorganic oxides, such as silica, alumina, magnesia, thoria, zirconia and mixtures of such oxides. Preferably, porous silica is used as the support according to the present invention as higher bulk densities and higher catalyst productivities may be obtained therewith. Silica may be in the form of particles having a mean particle diameter of about 1 micron to about 500 microns, preferably from 5 microns to 150 microns and most preferably from 10 microns to 100 microns. Lower mean particle diameter produce a higher level of polymer fines and higher mean particle diameter reduces polymer bulk density. The silica may have a surface area of about 5 m$^2$/g to about 1500 m$^2$/g, preferably from 50 m$^2$/g to 1000 m$^2$/g and a pore volume of from about 0.1 cm$^3$/g to about 10.0 cm$^3$/g, preferably from 0.3 cm$^3$/g to 3.5 cm$^3$/g, as higher catalyst productivity may be obtained in this range.

The dehydrated solid support can be obtained by drying the solid support in order to remove physically bound water and to reduce the content of hydroxyl groups to a level which may be of from about 0.1 mmol to about 5.0 mmol hydroxyl groups per gram of support, preferably from about 0.2 mmol to about 2.0 mmol hydroxyl groups per gram of support, as this range allows sufficient incorporation of the active catalyst components to the support, determined by the method as described in J. J. Fripiat and J. Uytterhoeven, J. Phys. Chem. 66, 800, 1962 or by applying $^1$H NMR spectroscopy. The hydroxyl groups content in this range may be achieved by heating and fluidizing the support at a temperature of from about 150° C. to about 900° C. for a time of about 1 hour to about 15 hours under a nitrogen or air flow. The dehydrated support can be slurried, preferably by stirring, in a suitable hydrocarbon solvent in which the individual catalyst components are at least partially soluble. Examples of suitable hydrocarbon solvents include n-pentane, iso-pentane, cyclopentane, n-hexane, isohexane, cyclohexane, n-heptane, isoheptane, n-octane, isooctane and n-decane. The amount of solvent used is not critical, though the solvent should be used in an amount to provide good mixing of the catalyst components.

The magnesium compound is represented by the general formula MgR$^1$R$^2$, wherein R$^1$ and R$^2$ are the same or different and are independently selected from a group comprising an alkyl group, alkenyl group, alkadienyl group, aryl group, alkaryl group, alkenylaryl group and an alkadienylaryl group and may have from 1 to 20 carbon atoms. Suitable examples of the magnesium compound include dimethylmagnesium, diethylmagnesium, ethylmethylmagnesium, di-n-propylmagnesium, diisopropylmagnesium, n-propylethylmagnesium, isopropylethylmagnesium, di-n-butylmagnesium, diisobutylmagnesium, n-butylethylmagnesium, n-butyl-n-propylmagnesium, n-butylisopropylmagnesium, isobutylethylmagnesium, isobutyl-n-propylmagnesium, isobutylisopropylmagnesium, di-n-pentylmagnesium, diisopentylmagnesium, n-pentylethylmagnesium, n-pentyl-n-propylmagnesium, n-pentylisopropylmagnesium, n-pentyl-n-butylmagnesium, n-pentylisobutylmagnesium, di-n-hexylmagnesium, diisohexylmagnesium, n-hexylethylmagnesium, n-hexyl-n-propylmagnesium, n-hexylisopropylmagnesium, n-hexyl-n-butylmagnesium, n-hexylisobutylmagnesium, isohexylethylmagnesium, isohexyl-n-propylmagnesium, isohexylisopropylmagnesium, isohexyl-n-butylmagnesium, isohexylisobutylmagnesium, di-n-octylmagnesium, diisooctylmagnesium, n-octylethylmagnesium, n-octyl-n-propylmagnesium, n-octylisopropylmagnesium, n-octyl-n-butylmagnesium, n-octylisobutyl magnesium, isooctylethylmagnesium, isooctyl-n-propylmagnesium, isooctylisopropylmagnesium, isooctyl-n-butylmagnesium, isooctylisobutylmagnesium, dicyclopentylmagnesium, cyclopentylethylmagnesium, cyclopentyl-n-propylmagnesium, cyclopentylisopropylmagnesium, cyclopentyl-n-butylmagnesium, cyclopentylisobutylmagnesium, dicyclohexylmagnesium, cyclohexylethylmagnesium, cyclohexyl-n-propylmagnesium, cyclohexylisopropylmagnesium, cyclohexyl-n-butylmagnesium, cyclohexylisobutylmagnesium, diphenylmagnesium, phenylethylmagnesium, phenyl-n-propylmagnesium, phenyl-n-butylmagnesium and mixtures thereof.

Preferably, the magnesium compound is selected from the group comprising di-n-butylmagnesium, n-butylethylmagnesium and n-octyl-n-butylmagnesium.

The magnesium compound can be used in an amount ranging from about 0.01 to about 10.0 mmol per gram of solid support, preferably from about 0.1 to about 3.5 mmol per gram of support and more preferably from 0.3 to 2.5 mmol per gram of support as by applying this range the level of polymer fines of the product may be reduced and higher catalyst productivity may be obtained. The magnesium compound may be reacted, preferably by stirring, with the support at a temperature of about 15° C. to about 140° C. during about 5 minutes to about 150 minutes, preferably at a temperature of about 20° C. to 80° C. for a duration of 10 minutes to 100 minutes.

The molar ratio of Mg to OH groups in the solid support applied in the process according to the present invention can be in the range of about 0.01 to about 10.0, preferably of from about 0.1 to about 5.0 and more preferably of from about 0.1 to about 3.5, as the level of polymer fines of the product may be reduced and higher catalyst productivity may be obtained.

The modifying compound (A) may be at least one oxygen and/or nitrogen comprising organic compound.

Such an at least one oxygen and/or nitrogen comprising organic compound may be selected from the group of at least one ketone, carboxylic acid, carboxylic acid ester, acyl halide, aldehyde and alcohol or aminoketone.

Modifying compound (A) may especially for example be acetic acid, propionic acid, isopropionic acid, butyric acid, isobutyric acid, valeric acid, isovaleric acid, caproic acid, isocaproic acid, enanthic acid, isoenanthic acid, caprylic acid, isocaprylic acid, pelargonic acid, isopelargonic acid, capric acid, isocapric acid, cyclopentanecarboxylic acid, benzoic acid, methyl n-propyl ketone, ethyl acetate, n-butyl acetate, isobutyraldehyde, methyl acetate, ethyl acetate, n-propyl acetate, isopropyl acetate, n-butyl acetate, isobutyl acetate, isoamyl acetate, ethyl butyrate, n-butyl butyrate and/or isobutyl butyrate, pentan-2-one, dimethyl ketone, diethyl ketone, methyl ethyl ketone, di-n-propyl ketone, di-n-butyl ketone, methyl n-propyl ketone, methyl isobutyl ketone, cyclohexanone, methyl phenyl ketone, ethyl phenyl ketone, n-propyl phenyl ketone, n-butyl phenyl ketone, isobutyl phenyl ketone, diphenyl ketone, ethanoyl chloride, propanoyl chloride, isopropanoyl chloride, n-butanoyl chloride, isobutanoyl chloride, benzoyl chloride, acetaldehyde, propionaldehyde, n-butyraldehyde, isobutyraldehyde, n-pentanaldehyde, isopentanaldehyde, n-hexanaldehyde, isohexanaldehyde, n-heptanaldehyde, benzaldehyde methanol, ethanol, n-propanol, isopropanol, n-butanol, isobutanol, sec-butanol, tert-butanol, cyclobutanol, n-pentanol, isopentanol, cyclopentanol, n-hexanol, isohexanol, cyclohexanol, n-octanol, isooctanol, 2-ethylhexanol, phenol, cresol, ethylene glycol, propylene glycol and/or mixtures thereof.

The modifying compound (A) may preferably for example be at least one compound selected from the group comprising pentan-2-one, methyl n-propyl ketone, ethyl acetate, n-butyl acetate, acetic acid, isobutyric acid, isobutyraldehyde, ethanoyl chloride, ethanol and sec-butanol, and more preferably from methyl n-propyl ketone, n-butyl acetate, isobutyric acid and ethanoyl chloride.

Modifying compound (A) may also be for example at least one 4-amino-pent-3-en-2-one according to Structure I,

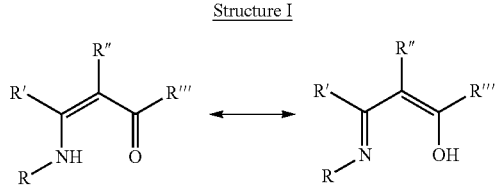

Structure I where R may be independently selected from the group of: H, an alkyl, especially for example an alkyl comprising 1 to 10 carbon atoms, an aryl, especially for example an aryl comprising 1 to 8 carbon atoms, further preferred for example a phenyl, a substituted alkyl, especially for example a substituted alkyl comprising 1 to 20 carbon atoms, a substituted aryl, especially for example a substituted aryl comprising 1 to 18 carbon atoms, further preferred for example a halogenated phenyl, a cyclic alkyl, especially for example a cyclic alkyl comprising 1 to 8 carbon atoms, an aryl substituted by a functional group comprising 1 to 8 carbon atoms and/or at least one heteroatom selected for example from O, N and/or S, especially for example 2-methoxyphenyl, or an alkyl substituted by a functional group comprising 1 to 8 carbon atoms and/or at least one heteroatom selected for example from O, N and/or S, especially for example ethan-2-ol, and R', R", R''' may each be independently selected from the group of: H, an alkyl, especially for example an alkyl comprising 1 to 10 carbon atoms, an aryl, especially for example an aryl comprising 1 to 8 carbon atoms, a substituted or unsubstituted fused cyclic alkyl or aryl, preferably for example a fused cyclic alkyl or aryl comprising 1 to 8 or 1 to 12 carbon atoms, a substituted alkyl or substituted aryl, especially for example a substituted alkyl or substituted aryl comprising 1 to 20 carbon atoms, further preferred for example a substituted or unsubstituted phenyl. Substituted in the sense of the present invention may thereby mean especially for example substituted by an alkyl, especially for example and alkyl with 1 to 12 or 1 to 8 carbon atoms and/or substituted by a functional group comprising 1 to 8 carbon atoms and/or at least one heteroatom selected for example from O, N and/or S and/or substituted by a halogen. Fused cyclic alkyl or aryl may mean that at least two of R', R" or R''' can be connected together to form a cyclic alkyl group and/or an aryl group, preferably for example a cyclopentyl, a cyclohexyl, an phenyl, a biphenyl and/or an indenyl group. Mixtures of two or more of the compounds recited above may also be used as modifying compound (A).

Suitable examples of the 4-amino-pent-3-en-2-ones include for example 4-methylamino-pent-3-en-2-one, 4-ethylamino-pent-3-en-2-one, 4-n-propylamino-pent-3-en-2-one, 4-isopropylamino-pent-3-en-2-one, 4-n-butylamino-pent-3-en-2-one, 4-sec-butylamino-pent-3-en-2-one, 4-isobutylamino-pent-3-en-2-one, 4-tert-butylamino-pent-3-en-2-one, 4-n-pentylamino-pent-3-en-2-one, 4-phenylamino-pent-3-en-2-one, 4-cyclopentylamino-pent-3-en-2-one, 4-cyclohexylamino-pent-3-en-2-one, 3-(butylamino)-1,3-diphenyl-2-Propen-1-one, 4-(butylamino)-3-methyl-3-Penten-2-one, 3-(butylamino)-1-phenyl-2-Buten-1-one.

Preferably, the modifying compound (A) may be for example at least one compound selected from the group comprising 4-methylamino-pent-3-en-2-one, 4-n-butylamino-pent-3-en-2-one, 4-tert-butylamino-pent-3-en-2-one, 4-cyclohexylamino-pent-3-en-2-one.

The molar ratio of modifying compound (A) to magnesium in the solid support can be in a range of from about 0.01 to about 10.0, preferably of from about 0.1 to about 5.0, more preferably of from about 0.1 to about 3.5, more preferably of from about 0.5 to about 3.5, more preferably of from about >1 to about 3.5 and most preferably of from 0.3 to 2 or from about 0.3 to 1.5, as higher catalyst productivity and higher bulk density of the products may be obtained. Lowering the molar ratio of compound (A) to magnesium to >1 may thereby lead to increasing for example Mz and/or Mz+1 of the obtained polymer, which may in turn be beneficial for the mechanical properties of the obtained polymer, especially when compounds (A) and (B) and (C) are added. The modifying compound (A) may be added to the reaction product obtained in step (a), preferably by stirring, at a temperature of about 15° C. to about 140° C. for a duration of about 5 minutes to about 150 minutes, preferably at a temperature of 20° C. to 80° C. for a duration of 10 minutes to 100 minutes. The molar ratios referred to according to the invention are the molar ratios used/added in the process according to the invention.

The modifying compound (B) is a silicon compound represented by the general formula $R^{11}{}_f(R^{12}O)_g SiX_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and $R^{11}$ and $R^{12}$ are the same or different. $R^{11}$ and $R^{12}$ are independently selected from the group of compounds comprising an alkyl group, alkenyl group, alkadienyl group, aryl group, alkaryl group, alkenylaryl group and an alkadienylaryl group. $R^{11}$ and $R^{12}$ may have from 1 to 20 carbon atoms.

Suitable silicon compounds include tetramethoxysilane, tetraethoxysilane, tetra-n-propoxysilane, tetraisopropoxysilane, tetra-n-butoxysilane, tetraisobutoxysilane, methyltrimethoxysilane, ethyltrimethoxysilane, n-propyltrimethoxysilane, isopropyltrimethoxysilane, n-butyltrimethoxysilane, isobutyltrimethoxysilane, n-pentyltrimethoxysilane, n-hexyltrimethoxysilane, n-octyltrimethoxysilane, isooctyltrimethoxysilane, vinyltrimethoxysilane, phenyltrimethoxysilane, dimethyldimethoxysilane, diethyldimethoxysilane, isobutylmethyldimethoxysilane, diisopropyldimethoxysilane, diisobutyldimethoxysilane, isobutylisopropyldimethoxysilane, dicyclopentyldimethoxysilane, cyclohexylmethyldimethoxysilane, phenylmethyldimethoxysilane, diphenyldimethoxysilane, trimethylmethoxysilane, triethylmethoxysilane, methyltriethoxysilane, ethyltriethoxysilane, n-propyltriethoxysilane, isopropyltriethoxysilane, n-butyltriethoxysilane, isobutyltriethoxysilane, n-pentyltriethoxysilane, n-hexyltriethoxysilane, n-octyltriethoxysilane, isooctyltriethoxysilane, vinyltriethoxysilane, phenyltriethoxysilane, dimethyldiethoxysilane, diethyldiethoxysilane, isobutylmethyldiethoxysilane, diisopropyldiethoxysilane, diisobutyldiethoxysilane, isobutylisopropyldiethoxysilane, dicyclopentyldiethoxysilane, cyclohexylmethyldiethoxysilane, phenylmethyldiethoxysilane, diphenyldiethoxysilane, trimethylethoxysilane, triethylethoxysilane, silicon tetrachloride, methyltrichlorosilane, ethyltrichlorosilane, n-propyltrichlorosilane, isopropyltrichlorosilane, n-butyltrichlorosilane, isobutyltrichlorosilane, n-pentyltrichlorosilane, n-hexyltrichlorosilane, n-octyltrichlorosilane, isooctyltrichlorosilane, vinyltrichlorosilane, phenyltrichlorosilane, dimethyldichlorosilane, diethyldichlorosilane, isobutylmethyldichlorosilane, diisopropyldichlorosilane, diisobutyldichlorosilane, isobutylisopropyldichlorosilane, dicyclopentyldichlorosilane, cyclohexylmethyldichlorosilane, phenylmethyldichlorosilane, diphenyldichlorosilane, trimethylchlorosilane, triethylchlorosilane, chlorotrimethoxysilane, dichlorodimethoxysilane, trichloromethoxysilane, chlorotriethoxysilane, dichlorodiethoxysilane, trichloroethoxysilane and mixtures thereof.

Preferably, the modifying compound (B) used is tetraethoxysilane, n-propyltriethoxysilane, isobutyltrimethoxysilane, dimethyldichlorosilane, n-butyltrichlorosilane and silicon tetrachloride, and more preferably isobutyltrimethoxysilane, tetraethoxysilane, n-propyltriethoxysilane, n-butyltrichlorosilane and silicon tetrachloride as higher catalyst productivity and higher bulk density may be obtained with the ability to vary the molecular weight distribution of the product by employing these preferred compounds.

The molar ratio of modifying compound (B) to magnesium may be in a range of from about 0.01 to about 5.0, preferably from about 0.01 to about 3.0, more preferably from about 0.01 to about 1.0 and most preferably from about 0.01 to about 0.3, especially from about 0.02 to 0.2 or from about 0.05 to 0.15. The addition of compound (B) may thereby lead for example to higher catalyst productivity and/or higher bulk density. The modifying compound (B) may be added to the reaction product obtained in step (a), preferably by stirring, at a temperature of about 15° C. to about 140° C. during about 5 minutes to about 150 minutes, preferably at a temperature of 20° C. to 80° C. during 10 minutes to 100 minutes.

The modifying compound (C) is a transition metal alkoxide represented by the general formula $(R^{13}O)_4M$, wherein M is a titanium atom, a zirconium atom or a vanadium atom, O is an oxygen atom and $R^{13}$ is a compound selected from the group of compounds comprising an alkyl group, alkenyl group, alkadienyl group, aryl group, alkaryl group, alkenylaryl group and an alkadienylaryl group. $R^{13}$ may have from 1 to 20 carbon atoms.

Suitable transition metal alkoxide compounds include titanium tetramethoxide, titanium tetraethoxide, titanium tetra-n-propoxide, titanium tetraisopropoxide, titanium tetra-n-butoxide, titanium tetraisobutoxide, titanium tetra-n-pentoxide, titanium tetraisopentoxide, titanium tetra-n-hexoxide, titanium tetra-n-heptoxide, titanium tetra-n-octoxide, titanium tetracyclohexoxide, titanium tetrabenzoxide, titanium tetraphenoxide, zirconium tetramethoxide, zirconium tetraethoxide, zirconium tetra-n-propoxide, zirconium tetraisopropoxide, zirconium tetra-n-butoxide, zirconium tetraisobutoxide, zirconium tetra-n-pentoxide, zirconium tetraisopentoxide, zirconium tetra-n-hexoxide, zirconium tetra-n-heptoxide, zirconium tetra-n-octoxide, zirconium tetracyclohexoxide, zirconium tetrabenzoxide, zirconium tetraphenoxide, vanadium tetramethoxide, vanadium tetraethoxide, vanadium tetra-n-propoxide, vanadium tetraisopropoxide, vanadium tetra-n-butoxide, vanadium tetraisobutoxide, vanadium tetra-n-pentoxide, vanadium tetraisopentoxide, vanadium tetra-n-hexoxide, vanadium tetra-n-heptoxide, vanadium tetra-n-octoxide, vanadium tetracyclohexoxide, vanadium tetrabenzoxide, vanadium tetraphenoxide or mixtures thereof. Preferably, titanium tetraethoxide, titanium tetra-n-butoxide and zirconium tetra-n-butoxide are used in present invention because higher catalyst productivity and higher bulk density may be obtained with the ability to vary the molecular weight distribution of the product by employing these preferred compounds.

The molar ratio of the modifying compound (C) to magnesium may be in the range of from about 0.01 to about 5.0, preferably from about 0.01 to about 3.0, more preferably from about 0.01 to about 5.0, preferably from about 0.01 to about 3.0, more preferably from about 0.01 to about 1.0 and most preferably from about 0.01 to about 0.3, especially from about 0.02 to 0.2 or from about 0.05 to 0.15. The addition of compound (C) may thereby lead for example to higher catalyst productivity and/or higher bulk density and/or improved hydrogen response in polymerization may be obtained. The modifying compound (C) may be reacted, preferably by stirring, with the product obtained in step (a) at a temperature of about 15° C. to about 140° C. for a duration of about 5 minutes to about 150 minutes, preferably at a temperature of 20° C. to 80° C. for a duration of 10 minutes to 100 minutes.

The modifying compounds (A), (B) and (C) can be contacted in any order or simultaneously with the solid magnesium containing support obtained in step (a). Preferably, (A) is added first to the reaction product obtained in step (a) and then (B), followed by the addition of (C) as higher catalyst productivity and higher product bulk density may be obtained by employing this order of adding the modifying compounds. Pre-mixtures of the individual catalyst components can also be effectively utilized in this invention.

When modifying compound (A) is 4-n-butylamino-pent-3-en-2-one or 4-amino-pent-3-en-2-one and modifying compound (C) is titanium tetraethoxide, a further increase of molecular weight distribution may be obtained for example when modifying compound (B) is selected in the following order from the group consisting of isobutyltrimethoxysilane, n-propyltriethoxysilane, tetraethoxysilane, n-butyltrichlorosilane and silicon tetrachloride, at the same levels of titanium halide compound.

When the modifying compound (B) is silicon tetrachloride and modifying compound (C) is titanium tetraethoxide, a further improved combination of catalyst productivity and bulk density may be obtained for example when modifying compound (A) is a 4-amino-pent-3-en-2-one.

The titanium halide compound used in the present invention is represented by the general formula $TiX_4$, wherein Ti is a titanium atom and X is a halide atom.

Suitable titanium halide compounds include titanium tetrachloride, titanium tetrabromide, titanium tetrafluoride or mixtures thereof. The preferred titanium halide compound is titanium tetrachloride, as higher catalyst productivity is obtained. The molar ratio of the titanium halide compound to magnesium may be in the range of about 0.01 to about 10.0, preferably from about 0.01 to about 5.0 and more preferably from about 0.05 to about 1.0, as a better balance of high catalyst productivity and high bulk density may be obtained. Lowering the molar ratio of titanium halide compound to magnesium to <1 may thereby lead to increasing for example Mz and/or Mz+1 of the obtained polymer, which may in turn be beneficial for the mechanical properties of the obtained polymer, especially when only compound (A) is added, without compound(s) (B) and/or (C).

The titanium halide compound may be added to the reaction mixture obtained by applying step (a) and step (b) in any conventional manner, such as by stirring, at a temperature of about 15° C. to about 140° C. for a duration of about 5 minutes to about 150 minutes, preferably at a temperature of 20° C. to 80° C. for a duration of 10 minutes to 100 minutes. The reaction mixture may be then dried using a nitrogen purge and/or by vacuum at a temperature from about 15° C. to about 140° C., preferably 30° C. to 100° C. and most preferably 50° C. to 80° C. to yield the final solid catalyst component.

The total molar ratio of the modifying compound (C) and the titanium halide compound to magnesium may be in the range of from about 0.01 to about 10.0, preferably of from about 0.01 to about 5.0, more preferably from about 0.01 to about 2.0 and most preferably from about 0.01 to about 1.5, especially from about 0.05 to 1.2 or from about 0.1 to 1 or from about 0.01 to <1, preferably from about 0.05 to 0.9, as a better balance of high catalyst productivity and high bulk density may be obtained.

The total molar ratio of the modifying compound (C) and the titanium halide compound to hydroxyl (OH) groups in the support after dehydration may be in the range of from about 0.01 to about 10.0, preferably of from about 0.01 to about 5.0 and more preferably of from about 0.05 to about 1.0, as a better balance of high catalyst productivity and high bulk density may be obtained. Higher levels would produce high catalyst productivity though with reduced bulk density, especially in a gas phase polymerization processes. Further, applying these amounts eliminates the requirement to conduct solvent decanting, solvent filtering, solvent washing steps in catalyst preparation and hence eliminates generation of highly hazardous solvent waste material.

The invention also relates to a solid catalyst component obtainable by the process as described herewith. The solid polymerization catalyst component shows a combination of higher productivity in ethylene polymerization and copolymerization process, higher bulk density and the molecular weight distribution of the ethylene polymers and copolymers can be controlled by applying this solid catalyst component.

The invention relates to a process wherein an organometallic compound, which may be used as a co-catalyst, may be added before step (a) or after step (c).

An organometallic compound may be for example at least one aluminum alkyl, aluminum alkyl halide, aluminum alkyl hydride, lithium alkyl, lithium aluminum alkyl, lithium aluminum hydride, zinc alkyl, calcium alkyl, magnesium alkyl or mixtures of two or more thereof. Preferred organometallic compounds are represented by the general formula $R^{14}_n AlX_{3-n}$, wherein X represents a halide atom; n represents an integer from 0 to 3; and $R^{14}$ is selected from a group of compounds comprising an alkyl group, alkenyl group, alkadienyl group, aryl group, alkaryl group, alkenylaryl group and alkadienylaryl group. $R^{14}$ may have from 1 to 20 carbon atoms. Suitable examples of an organometallic compound include trimethylaluminum, triethylaluminum, tri-isobutylaluminum, tri-n-hexylaluminum, tri-n-octylaluminum, diethylaluminum chloride, diisobutylalumium chloride, ethylaluminium dichloride, isobutyl laluminum dichloride and mixtures thereof. Preferably, the cocatalyst is trimethylaluminum, triethylaluminum and/or tri-isobutylaluminum; and more preferably, the cocatalyst is triethylaluminum.

The organometallic compound may be used in a molar ratio of organometallic compound to the magnesium compound of for example between 0.001 and about 20, more preferably between 0.01 and 2, further preferred between 0.03 and 1, further preferred between 0.04 and 0.7, further preferred between 0.05 and 0.5 or between >0.05 and <0.5, and/or in a molar ratio of organometallic compound to titanium halide compound of for example between about 0.001 and about 50, more preferably between 0.01 and 5, further preferred between 0.03 and 1, further preferred between 0.04 and 0.8, further preferred between 0.05 and 0.7, further preferred between from 0.06 and 0.6 or between >0.06 and <0.6. The organometallic compound may especially be used in a molar ratio of organometallic compound to magnesium compound of for example between 0.05 and 0.5, and/or in a molar ratio of organometallic compound to titanium halide compound of for example between from 0.06 and 0.6. This may lead to a narrower MWD and/or a lower molecular weight and/or a higher melt index (MI) as measured for example according to ASTM D1238 at a temperature of 190° C. and a load of 2.16 kg or 21.6 kg.

Alternatively, the organometallic compound may be used in a molar ratio of organometallic compound to the magnesium compound of for example between 0.001 and about 20, more preferably between 0.01 and 2.5, further preferred between 0.05 and 1.5, further preferred between 0.1 and 1, further preferred between 0.2 and 0.9 or between >0.2 and <0.9, and/or in a molar ratio of organometallic compound to titanium halide compound of for example between 0.05 and 5, further preferred between 0.1 and 2.5, further preferred between 0.15 and 1.5, further preferred between 0.2 and 1 or >0.2 and <1. Alternatively, the organometallic compound may especially be used in a molar ratio of organometallic compound to the magnesium compound of for example between between 0.2 and 0.9 and/or in a molar ratio of organometallic compound to titanium halide compound of for example between 0.2 and 1. This may lead to an increased catalyst activity, especially for example when the organometallic compound is added after step (c).

An organometallic compound may be added to the reaction mixture in any conventional manner, such as by stirring, at a temperature of about 15° C. to about 140° C. for a duration of about 5 minutes to about 150 minutes, preferably at a temperature of 20° C. to 80° C. for a duration of 10 minutes to 100 minutes.

The catalyst system according to the present invention can be applied in slurry, gas or solution phase conventional processes to obtain polyethylenes. These processes have already been described in the prior art and are thus well-known to the skilled person. Preferably, ethylene homopolymers and copolymers are produced by gas phase processes, such as stirred bed reactors and fluidized bed reactors or by slurry phase processes under polymerisation conditions already known in the art. Illustrative of gas phase processes are those disclosed for example in U.S. Pat. Nos. 4,302,565 and 4,302,566. A suitable example is a gas phase fluidized bed polymerization reactor fed by a dry or slurry solid catalyst feeder. The solid catalyst component may be introduced to the reactor in a site within the reaction zone to control the reactor production rate. The reactive gases, including ethylene and other alpha-olefins, hydrogen and nitrogen may be introduced to the reactor. The produced polymer may be discharged from the reaction zone through a discharge system. The bed of polymer particles in the reaction zone may be kept in fluidized state by a recycle stream that works as a fluidizing medium as well as to dissipate exothermal heat generated within the reaction zone. The reaction and compression heats can be removed from the recycle stream in an external heat exchange system in order to control the reactor temperature. Other means of heat removal from within the reactor can also be utilized, for example by the cooling resulting from vaporization of hydrocarbons such as iso-pentane, n-hexane or isohexane within the reactor. These hydrocarbons can be fed to the reactor as part of component reactant feeds and/or separately to the reactor to improve heat removal capacity from the reactor. The gas composition in the reactor can be kept constant to yield a polymer with the required specifications by feeding the reactive gases, hydrogen and nitrogen to make-up the composition of recycle stream.

Suitable operating conditions for the gas phase fluidized bed reactor typically include temperatures in the range of about 50° C. to about 115° C., more preferably from 70° C. to 110° C., an ethylene partial pressure from about 3 bar to 15 bar, more preferably from 5 bar to 10 bar and a total reactor pressure from about 10 bar to 40 bar, more preferably from 15 bar to 30 bar. The superficial velocity of the gas, resulting from the flow rate of recycle stream within reactor may be from about 0.2 m/s to about 1.2 m/s, more preferably 0.2 m/s to 0.9 m/s.

By applying the process and catalyst system according to the present invention ethylene homopolymers and copolymers, e.g. block and random copolymers can be produced. Examples of polyethylenes produced include homopolyethylene, linear low density polyethylene (LLDPE), medium density polyethylene (MDPE), high density polyethylene (HDPE) and very low density polyethylene (VLDPE); preferably, homopolyethylene, LLDPE, MDPE and HDPE are produced according to the present invention. Suitable examples of copolymers obtained according to the present invention may include ethylene copolymers with an alpha-olefin or di-olefin co-monomers, having from 3 to 20 carbon atoms, such as propylene, 1-butene, 1-pentene, 1-hexene, 1-octene, 4-methyl-1-pentene, 1,3-butadiene, 1,4-pentadiene, 1,5-hexadiene and mixtures thereof. Preferably, 1-butene and 1-hexene are used as co-monomers. The amount of the comonomer needed depend generally on the desired product properties and specific comonomer used. The skilled person can easily select the required amount to obtain the desired product. In general, the present invention provides a polymer composition containing 0 to about 30 wt. % of one or more comonomers and from about 70 to about 100 wt. % of ethylene units.

An ethylene homopolymer or copolymer with a melt index (MI) in the range of about 0.1 g/10 min to about 150 g/10 min, preferably 0.3 g/10 min to 80 g/10 min (measured by ASTM D1238 at a temperature of 190° C. and a load of 2.16 kg) can be obtained by using the catalyst system of present invention conventionally by varying the hydrogen to ethylene molar ratio; increasing the hydrogen to ethylene molar ratio generally leads to an increase in the melt index. Also, the melt index of the polymers can be varied by controlling the polymerization temperature and the density of the polymer obtained. A polymer density in the range of about 0.850 g/cm$^3$ to about 0.975 g/cm$^3$, more preferably 0.880 g/cm$^3$ to 0.970 g/cm$^3$ can be obtained using the catalyst system according to the present invention and by varying the comonomer to ethylene molar ratio; for instance, increasing the comonomer to ethylene molar ratio typically leads to a reduction in density. Lower ratios of hydrogen to ethylene and lower ratios of comonomer to ethylene can be used to attain the target melt index and target polymer density, respectively, reducing the cost requirement of the utilisation of hydrogen and comonomer.

The polyethylene compositions according to the present invention may for example be used in blown film extrusion, cast film extrusion, injection moulding and rotational moulding for producing articles such as, for example, shopping bags, shipping sacks, manual stretch wrap film, food wrap (cling film), ice bags, frozen food bags, pallet stretch wrap film, greenhouse film, lamination, screw closures, bottle caps, food containers, crates, trays, pails, shipping containers, industrial tanks, agricultural tanks, chemical shipping drums, carpet packing, trash containers and toys. The compositions may also contain additives such as for example lubricants, fillers, process stabilisers, antiblock, slip agents, UV stabilisers, antioxidants, compatibilizers, antistatic agents, processing aids and pigments.

EP 0244678 A1 discloses a process for the preparation of a solid catalyst component involving slurrying silica with n-butyl ether, reacting with n-BuMgCl, multiple washings with n-butyl ether and n-heptane, vacuum drying to obtain a solid intermediate and transferring to a separate vessel, treating the intermediate with n-heptane, and simultaneously Ti(OBu)$_4$ and Si(OEt)$_4$, reacting again with n-BuMgCl, multiple washings with n-heptane, vacuum drying to obtain a solid intermediate and transferring to a separate vessel, treating the intermediate with monochlorobenzene and diisobutyl phthalate, subjecting the reaction mixture to solid-liquid separation, multiple washings with n-heptane, treating with monochlorobenzene, n-butyl ether and titanium tetrachloride, subjecting the reaction mixture to solid-liquid separation, multiple washings with monochlorobenzene, treating again with monochlorobenzene, n-butyl ether and titanium tetrachloride, multiple washings with n-heptane and vacuum drying.

The solid catalyst component disclosed in EP 0244678 A1 is used to polymerize propylene homo or copolymers in the presence of AlEt3 and phenyltriethoxysilane. EP 0244678 A1 does not relate to the production of an ethylene polymer and uses an excess of catalyst components during the process of catalyst preparation.

Further, multiple solvent washings with high levels of solvents, combined with the use of aromatic ester in catalyst preparation, generates high levels of hazardous solvent waste material. The catalyst synthesis steps of EP 0244678 A1 require a more complicated catalyst composition and process of preparation of the solid catalyst composition in comparison with the process according to the present invention.

Furthermore different silica dehydration temperatures are applied in EP 0244678 A1 as compared to the process according to the present invention.

EP 0244678 A1 discloses multiple different uses of n-butyl ether in the synthesis of the solid catalyst component being as a mixture with titanium tetrachloride, as a solvent for n-butyl magnesium chloride and for catalyst solvent washing steps. In contrast the process according to the present invention does not use an ether compound. EP 0244678 A1 discloses the use of two treatments with n-butyl magnesium chloride at different temperatures whereas only one treatment with di-n-butylmagnesium is used in the process according to the present invention. Interchange of n-butyl magnesium chloride and di-n-butylmagnesium in a catalyst composition is not straight forward, due to the significant difference in their reactivity with other components in the catalyst which produces different catalyst compositions. Furthermore excessive levels of n-butyl magnesium chloride are used in the process of EP 0244678 A1 as compared to di-n-butylmagnesium used in the process according to the present invention.

Another difference relates to the amount of Si(OEt)$_4$ in EP 0244678 A1 which is 3.69 mmol per gram of silica whereas in the process according to the present invention 0.10 mmol of the silicon compound per gram of silica is used. In contrast to the process of the present invention in EP 0244678 A1, Ti(OBu)$_4$ and Si(OEt)$_4$ are added simultaneously in the synthesis of the solid catalyst component, followed by the addition of diisobutyl phthalate and then a mixture of n-butyl ether and titanium tetrachloride whereas in the present invention the sequential addition, with reaction times for each individual component, in the order of carboxylic acids, carboxylic acid esters, ketones, acyl halides, aldehydes and alcohols followed by a silicon compound and then a transition metal (titanium, vanadium and zirconium) alkoxide compound and finally titanium tetrachloride is conducted.

A further difference relates to the use of the aromatic ester, diisobutyl phthalate in EP 0244678 A1 which is a concern in terms of generating hazardous solvent waste during washings and residues in the final polymer product. The process according to the present invention uses non aromatic esters such as ethyl acetate and n-butyl acetate, carboxylic acids, ketones, acyl halides, aldehydes and alcohols. Additionally the process according to the present invention does not use aromatic hydrocarbons or halogenated hydrocarbons. EP 0244678 A1 discloses multiple treatments of a mixture of an ether compound and titanium tetrachloride whereas the process according to the present invention does not use an ether compound and only single treatment with titanium tetrachloride is conducted.

The synthesis of the solid catalyst component of EP 0244678 A1 comprises 12 solvent washing steps with 3 different solvents, 2 intermediate drying and vessel transfer steps and 2 solid-liquid separation steps. Each of these steps is complicated, time consuming and expensive to conduct and produce high levels of highly hazardous solvent waste material especially due to the excessive levels of each catalyst component and the nature of diluents and solvents used in EP 0244678 A1. EP 0244678 A1 prefers washing steps with an excessive amount of an aromatic hydrocarbon solvent or a halogenated hydrocarbon solvent at least once at 50° C. to 120° C. and several times with an aliphatic hydrocarbon solvent. The process according to the present invention requires no solvent washings steps, intermediate drying and vessel transfer steps or solid-liquid separations.

EP 0032309 A2 discloses a complicated multi step process comprising a total of 25 solvent washing steps (each step using high solvent levels), 5 decanting steps, 3 filtering steps, 1 drying step and 3 re-suspending steps. This process for the preparation of a solid catalyst composition involves slurrying silica with isoparaffin fraction, reacting with an equimolar mixture of primary and secondary dibutylmagnesium, supernatant decanting, multiple washings with isoparaffin fraction, re-suspending in isoparaffin fraction, treating the intermediate with SiCl$_4$, supernatant decanting, multiple washings with isoparaffin fraction, filtering, treating the intermediate with ethylbenzoate in isoparaffin fraction, supernatant decanting, multiple washings with isoparaffin fraction, filtering, treating the intermediate with titanium tetrachloride, supernatant decanting, multiple washings with isoparaffin fraction at different temperatures, re-suspending in isoparaffin fraction, filtering, drying under vacuum, collecting a portion of the solid intermediate, transferring to a separate vessel and adding isoparaffin fraction, treating with Ti(OBu)$_4$, supernatant decanting, multiple washings with isoparaffin fraction and finally re-suspending in isoparaffin fraction. Each of said steps is complicated, time consuming and expensive to conduct and produce high levels of highly hazardous solvent waste material especially due to the excessive levels of each component and the nature of solvent used.

EP 0032309 A2 discloses the reaction of an equimolar mixture of primary and secondary dibutylmagnesium whereas the process according to the present invention uses MgR$^1$R$^2$ as defined in the description. Due to the different steric nature of the dibutylmagnesium, significantly different rates of reaction with other components of the catalyst and different resultant catalyst composition will be obtained when comparing EP 0032309 A2 and the process according to the present invention. EP 0032309 A2 discloses the direct reaction of a first component SiCl$_4$ with the addition of a second component dibutylmagnesium supported on silica for 60 hours at ambient temperature followed by 4 hours at 80° C. resulting in a chlorinated magnesium complex on silica. Also an excessive level of SiCl$_4$ is used in EP 0032309

A2 which will result in complete chlorination of the magnesium complex on silica. In EP 0032309 A2 ethylbenzoate is added after SiCl$_4$ addition. The requirement of this aromatic ester is a concern in terms of generating hazardous solvent waste during washings and residues in the final polymer product.

In the process according to the present invention a silicon compound is added after the reaction of carboxylic acids, carboxylic acid esters, ketones, acyl halides, aldehydes and alcohols directly with the di-n-butylmagnesium supported on silica, then the transition metal alkoxide compound is added and next titanium tetrachloride is added. These additions take place in one catalyst preparation vessel without any solvent washing steps, decanting steps, filtering steps, intermediate drying and vessel transfer steps or re-suspending steps. In the process according to the present invention the entire catalyst preparation process is conducted in one vessel.

Furthermore different silica dehydration temperatures are applied in EP 0032309 A2 as compared to the process according to the present invention.

The differences in catalyst preparation between EP 0032309 A2 and the present invention result in the formation of completely different catalyst compositions. Low catalyst productivity is obtained in polymerization in EP 0032309 A2.

EP 1052266 A1 discloses a process for the preparation of a solid catalyst component involving slurrying dehydrated (700° C. for 5 hours) silica with hexane, reacting with dibutylmagnesium at 50° C. for 1 hour, reacting with 1-butanol at 50° C. for 2 hours, reacting with silicon tetrachloride at 50° C. for 1 hour, reacting with titanium tetrachloride at 50° C. for 1 hour, removing solvent with a strong nitrogen flow and vacuum drying to obtain a solid catalyst component whereas in the process of the present invention in the catalyst preparation carboxylic acids, carboxylic acid esters, ketones, acyl halides, aldehydes and alcohols are reacted directly with di-n-butylmagnesium supported on silica, then the silicon compound is added, then the transition metal alkoxide compound is added and next titanium tetrachloride is added. In EP 1052266 A1 a molar ratio of SiCl$_4$ to Mg of 0.66 is used whereas in the process according to the present invention the molar ratio of the silicon compound to Mg ranges most preferably between 0.01 and 0.3, as higher catalyst productivity and higher bulk density may be obtained. Other differences relate to silica dehydration temperature, nature of solvent, higher level of catalyst components, longer reaction times and higher reaction temperatures in EP 1052266 A1 as compared to the process of the present invention in catalyst preparation.

The resulting LLDPE products of the process according to EP 1052266 A1 show a broad molecular weight distribution and a rather low productivity.

The invention will be elucidated by the following examples without being restricted thereby.

EXAMPLES

Silica was purchased from Grace Davison under the trade name of Sylopol 955 (mean particle diameter of 44 microns, a surface area of 303 m$^2$/g and a pore volume of 1.57 cm$^3$/g). Prior to use in catalyst preparation the silica was dehydrated by placing it in a vertical column, fluidizing under a nitrogen flow, gradually heating the column to 600° C., and then holding at that temperature for 4 hours, after which the silica was cooled to ambient temperature of about 25° C.

Two procedures were used for the determination of hydroxyl (OH) group content per gram of silica after dehydration:

One of the methods used to determine the hydroxyl group content in silica was based on the method described in J. J. Fripiat and J. Uytterhoeven, J. Phys. Chem. 66, 800, 1962. Dehydrated silica samples were treated with excess methylmagnesium iodide solution in tetrahydrofuran. To a flask connected to a digital pressure transducer were added 2.0 g of silica and 10.0 cm$^3$ of decahydronaphthalene. 2.0 cm$^3$ of a 3.0 molar solution of methylmagnesium iodide in tetrahydrofuran was then added to the flask and the content of the flasks was stirred for 30 minutes. All compounds additions were conducted under nitrogen atmosphere. The silica hydroxyl groups reacted with methylmagnesium iodide, producing an equal mole amount of methane; as a result, the pressure in the flask increased. The difference in initial pressure and pressure after reaction at a given temperature was measured and the resulted value was used to calculate the silica hydroxyl group content.

Another method used to determine the hydroxyl group content in silica was by $^1$H NMR spectroscopy on a Bruker 600 MHz NMR spectrometer, using a 5 mm probe at room temperature with deuterated tetrahydrofuran as solvent. Dehydrated silica samples were treated with excess benzyl magnesium chloride solution in tetrahydrofuran. 0.2 g of silica and 3.0 g of the benzyl magnesium chloride solution with a concentration of 1.0 wt. % were added into a vial under a nitrogen atmosphere. The vial was stirred for 30 minutes. The silica hydroxyl groups reacted with benzylmagnesium chloride producing an equal mole amount of toluene. The amount of the produced toluene was determined by $^1$H NMR spectroscopy and the silica hydroxyl group content was calculated based on the amount of toluene produced.

All the dehydrated silica samples employed in the examples were found to contain 0.90 to 1.00 mmol hydroxyl groups per gram of silica by both of the above silica hydroxyl group content analysis procedures.

Gel permeation chromatography (GPC) analysis was conducted on a Polymer Lab PL-220 instrument at 160° C. using a flow rate of 1.0 cm$^3$/min and 1,2,4-trichlorbenzene as the solvent in order to determine the number average molecular weight (Mn), weight average molecular weight (Mw) and molecular weight distribution (Mw/Mn) of the polymer resin.

Melt index (MI) of the polymer resin was measured according to ASTM D1238 at a temperature of 190° C. and a load of 2.16 kg or 21.6 kg.

Polymer density was measured using a density gradient column according to ASTM D2389.

Bulk density was measured according to ASTM D1895.

% Fines of the polymer was measured according to ASTM D1921.

Example 1

Synthesis of the Solid Catalyst Components X and X2

2.5 g of Sylopol 955 silica which had been dehydrated at 600° C. for 4 hours under a nitrogen flow was placed in a 40 cm$^3$ flask. 15 cm$^3$ of iso-pentane was added to slurry the silica, then 1.79 mmol of di-n-butylmagnesium was added to the flask and the resultant mixture was stirred for 60 minutes at a temperature of 35° C. Then, 2.51 mmol of pentan-2-one, was added to the flask and the resultant mixture was stirred for 60 minutes at a temperature of 35° C. Then, 0.25 mmol of tetraethoxysilane was added to the flask and the resultant mixture was stirred for 30 minutes at a temperature of 35° C. Next, 0.06 mmol of tetraethylorthotitanate was added to the flask and the resultant mixture was stirred for 30 minutes at a temperature of 35° C. Subsequently, 1.75 mmol of titanium tetrachloride was added to the flask and the resultant mixture was stirred for 30 minutes at a temperature of 35° C. Finally, the slurry was dried using a nitrogen purge at 70° C. for 60 minutes to yield a free-flowing solid product.

For the preparation of solid catalyst component X2 the process above for the preparation of solid catalyst component X was repeated but 0.16 mmol ethylaluminum dichloride was added before the addition of di-n-butylmagnesium. The resultant mixture was stirred for 30 minutes at a temperature of 35° C. before the addition of di-n-butylmagnesium.

Synthesis of the Solid Catalyst Component X3

2.5 g of Sylopol 955 silica which had been dehydrated at 600° C. for 4 hours under a nitrogen flow was placed in a 40 cm³ flask. 15 cm³ of iso-pentane was added to slurry the silica, then 1.79 mmol of di-n-butylmagnesium was added to the flask and the resultant mixture was stirred for 60 minutes at a temperature of 35° C. Then, 3.5 mmol of pentan-2-one, was added to the flask and the resultant mixture was stirred for 60 minutes at a temperature of 35° C. Then, 0.25 mmol of tetraethoxysilane was added to the flask and the resultant mixture was stirred for 30 minutes at a temperature of 35° C. Next, 0.06 mmol of tetraethylorthotitanate was added to the flask and the resultant mixture was stirred for 30 minutes at a temperature of 35° C. Subsequently, 1.75 mmol of titanium tetrachloride was added to the flask and the resultant mixture was stirred for 30 minutes at a temperature of 35° C. Finally, 0.33 mmol ethylaluminum dichloride was added and the resultant mixture was stirred for 30 minutes at a temperature of 35° C. The slurry was dried using a nitrogen purge at 70° C. for 60 minutes to yield a free-flowing solid product.

Example 2

Gas Phase Polymerization

A gas phase autoclave reactor with a volume of 1.6 liters was purged with nitrogen at 120° C. for 45 minutes followed by a pressure purge with monomer three times. The reactor was then allowed to cool to room temperature. Ethylene/hydrogen (ratio 0.015) was introduced to the reactor such as to raise the reactor pressure to 20.7 bar and the reactor temperature was raised to 85° C. Then, 1.0 mmol of triethylaluminum was injected into the reactor. This was followed by injection of 60.0 mg of the solid catalyst components X, X2 and X3, respectively, after being slurried in 20 cm³ of iso-pentane. Polymerization was carried out for 1 hour, with ethylene/hydrogen supplied on demand to maintain the total reactor pressure at 20.0 bar. Polymers obtained were analyzed see table 1 below.

TABLE 1

| Catalyst component | X | X2 | X3 |
|---|---|---|---|
| Mn/g/mol | 24331 | 24842 | 21768 |
| Mw/g/mol | 93000 | 85911 | 78026 |
| MWD | 3.79 | 3.45 | 3.5 |
| MI 21.6 Kg | 65.9 | 88.1 | 117.6 |

One can see that with solid catalyst components X2 and X3, which rely on the addition of an organometallic compound before step (a) or after step (c) molecular weight can be decreased, MWD is narrower and MI can be increased versus solid catalyst components X.

The invention claimed is:

1. A process for preparing a solid catalyst component suitable for producing polyethylene and its copolymers, said process comprising the steps of:
   (a) contacting a dehydrated support having hydroxyl groups with a magnesium compound having the general formula $MgR^1R^2$, wherein $R^1$ and $R^2$ are the same or different and are independently selected from an alkyl group, alkenyl group, alkadienyl group, aryl group, alkaryl group, alkenylaryl group, or alkadienylaryl group;
   (b) contacting the product obtained in step (a) with modifying compounds (A), (B) and (C), wherein:
      (A) is an oxygen and/or nitrogen containing organic compound selected from a ketone, carboxylic acid, carboxylic acid ester, acyl halide, aldehyde, alcohol, or aminoketone,
      (B) is a compound having the general formula $R^{11}{}_f(R^{12}O)_g SiX_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and $R^{11}$ and $R^{12}$ are the same or different and are independently selected from an alkyl group, alkenyl group, alkadienyl group, aryl group, alkaryl group, alkenylaryl group, or alkadienylaryl group;
      (C) is a compound having the general formula $(R^{13}O)_4M$, wherein M is a titanium atom, a zirconium atom or a vanadium atom, O is an oxygen atom and $R^{13}$ is selected from alkyl group, alkenyl group, alkadienyl group, aryl group, alkaryl group, alkenylaryl group, or alkadienylaryl group; and
   (c) contacting the product obtained in step (b) with a titanium halide compound having the general formula $TiX_4$, wherein Ti is a titanium atom and X is a halide atom,
   wherein an organometallic compound is added before step (a) and/or after step (c).

2. The process according to claim 1 wherein the molar ratio of Mg to hydroxyl groups is from 0.01 to 10.

3. The process according to claim 1 wherein the molar ratio of compound (A) to Mg is from 0.01 to 10 and/or of compound (B) to Mg is from 0.01 to 5 and/or the molar ratio of compound (C) to Mg is from 0.01 to 5.

4. The process according to claim 1 wherein the molar ratio of organometallic compound to magnesium compound is between 0.04 and 0.7 and/or the molar ratio of organometallic compound to titanium halide compound of between is between 0.04 and 0.8.

5. The process according to claim 1 wherein the molar ratio of the organometallic compound to the magnesium compound is between 0.05 and 1.5 and/or the molar ratio of organometallic compound to titanium halide compound is between 0.15 and 1.5.

6. The process according to claim 1 wherein the molar ratio of titanium halide compound to Mg is from 0.01 to 10.

7. The process according to claim 1 wherein the support is silica, alumina, magnesia, thoria, zirconia or mixtures thereof.

8. The process according to claim 1 wherein the support is silica.

9. The process according to claim 1 wherein compound (A) is selected from pentan-2-one, methyl n-propyl ketone, ethyl acetate, n-butyl acetate, acetic acid, isobutyric acid, isobutyraldehyde, ethanoyl chloride, ethanol and sec-butanol and/or 4-methylamino-pent-3-en-2-one, 4-n-butylamino-pent-3-en-2-one, 4-tert-butylamino-pent-3-en-2-one, or 4-cyclohexylamino-pent-3-en-2-one.

10. The process according to claim 1 wherein compound (B) is selected from tetraethoxysilane, n-propyltriethoxysilane, isobutyltrimethoxysilane, dimethyldichlorosilane, n-butyltrichlorosilane, or silicon tetrachloride.

11. The process according to claim 1 wherein compound (C) is selected from titanium tetraethoxide, titanium tetra-n-butoxide, or zirconium tetra-n-butoxide.

12. The process according to claim 1 wherein the total molar ratio of compound (C) and $TiX_4$ to hydroxyl groups is from 0.05 to 1.0.

13. The process according to claim 1 wherein $TiX_4$ compound is $TiCl_4$.

14. A solid catalyst component obtained by the process according to claim 1.

15. A process for producing polyethylene and its copolymers in the presence of the solid catalyst component according to claim 14 and a co-catalyst.

16. The process according to claim 1 wherein
the molar ratio of Mg to hydroxyl groups is from 0.01 to 10;
the molar ratio of compound (A) to Mg is from 0.01 to 10 and/or of compound (B) to Mg is from 0.01 to 5 and/or the molar ratio of compound (C) to Mg is from 0.01 to 5;
the molar ratio of organometallic compound to magnesium compound is between 0.04 and 0.7 and/or the molar ratio of organometallic compound to titanium halide compound is between 0.04 and 0.8;
the molar ratio of titanium halide compound to Mg is from 0.01 to 10.

17. The process according to claim 16, wherein
compound (A) is selected from pentan-2-one, methyl n-propyl ketone, ethyl acetate, n-butyl acetate, acetic acid, isobutyric acid, isobutyraldehyde, ethanoyl chloride, ethanol and sec-butanol and/or 4-methylamino-pent-3-en-2-one, 4-n-butylamino-pent-3-en-2-one, 4-tert-butylamino-pent-3-en-2-one, or 4-cyclohexylamino-pent-3-en-2-one;
compound (B) is selected from tetraethoxysilane, n-propyltriethoxysilane, isobutyltrimethoxysilane, dimethyldichlorosilane, n-butyltrichlorosilane, or silicon tetrachloride;
compound (C) is selected from titanium tetraethoxide, titanium tetra-n-butoxide, or zirconium tetra-n-butoxide; and
$TiX_4$ is $TiCl_4$.

18. A solid catalyst component obtainable by the process according to claim 17.

19. A process for producing polyethylene and its copolymers in the presence of the solid catalyst component according to claim 18 and a co-catalyst.

20. The process according to claim 1, wherein
the molar ratio of Mg to hydroxyl groups is from 0.01 to 10;
the molar ratio of compound (A) to Mg is from 0.01 to 10;
the molar ratio of compound (B) to Mg is from 0.01 to 5;
the molar ratio of compound (C) to Mg is from 0.01 to 5;
the molar ratio of the organometallic compound to the magnesium compound is between 0.04 and 0.7;
the molar ratio of the organometallic compound to the titanium halide compound is between 0.04 and 0.8; and
the molar ratio of the titanium halide compound to Mg is from 0.01 to 10.

21. The process according to claim 20, wherein the organometallic compound is added before step (a).

22. The process according to claim 21, wherein the organometallic compound is added after step (c).

* * * * *